(12) United States Patent
Sohn et al.

(10) Patent No.: US 10,580,238 B1
(45) Date of Patent: Mar. 3, 2020

(54) METHOD FOR PROVIDING ENHANCED TELEMATICS SERVICE AND TELEMATICS SERVER USING THE SAME

(71) Applicants: Hyundai Autoever, Seoul (KR); Hyundai AutoEver Telematics America, Inc., Fountain Valley, CA (US)

(72) Inventors: Changki Sohn, Gyeonggi-do (KR); Bongseok Kim, Irvine, CA (US)

(73) Assignees: Hyundai Autoever, Seoul (KR); Hyundai AutoEver Telematics America, Inc., Fountain Valley, CA (US)

( * ) Notice: Subject to any disclaimer, the term of this patent is extended or adjusted under 35 U.S.C. 154(b) by 0 days.

(21) Appl. No.: 16/426,388

(22) Filed: May 30, 2019

(51) Int. Cl.
| | |
|---|---|
| *B60R 25/01* | (2013.01) |
| *G07C 9/00* | (2020.01) |
| *G07C 5/00* | (2006.01) |
| *H04W 4/02* | (2018.01) |
| *H04W 4/40* | (2018.01) |
| *B60R 25/04* | (2013.01) |
| *B60R 16/037* | (2006.01) |

(52) U.S. Cl.
CPC .......... *G07C 9/00309* (2013.01); *B60R 25/01* (2013.01); *B60R 25/04* (2013.01); *G07C 5/008* (2013.01); *H04W 4/025* (2013.01); *H04W 4/40* (2018.02); *B60R 16/037* (2013.01); *G07C 2009/00507* (2013.01)

(58) Field of Classification Search
CPC ............... G07C 9/00309; G07C 5/008; G07C 2009/00507; H04W 4/40; H04W 4/025; B60R 25/01; B60R 25/04; B60R 16/037

USPC ................................................ 701/2, 36, 49
See application file for complete search history.

(56) References Cited

U.S. PATENT DOCUMENTS

| | | | | |
|---|---|---|---|---|
| 2006/0015221 | A1* | 1/2006 | Sarkar ................... | B60N 2/0248 701/2 |
| 2012/0164989 | A1* | 6/2012 | Xiao ....................... | G07C 5/008 455/414.1 |
| 2013/0297099 | A1* | 11/2013 | Rovik .................... | B60R 16/037 701/2 |
| 2017/0063994 | A1* | 3/2017 | Lei .......................... | B60L 58/12 |
| 2018/0059913 | A1* | 3/2018 | Penilla .................. | B60N 2/0228 |

\* cited by examiner

*Primary Examiner* — Nadeem Odeh
(74) *Attorney, Agent, or Firm* — Husch Blackwell LLP (57) ABSTRACT

A method for providing a telematics service based on a vehicle model is provided. The method includes steps of: (a) acquiring, by a telematics server, when a log-in request including information on a specific user and information on a specific vehicle is acquired from a telematics application installed on a specific telematics device, specific specification information on the specific vehicle; (b-i) acquiring a specific configuration, in which a first to a k-th telematics service items per telematics service category are set, in which serviceable telematics service items are set for each telematics service category as corresponding to each piece of hierarchy information on specifications of multiple vehicles; (b-ii) transmitting the specific configuration to the specific telematics device; and (b-iii) displaying, by the specific telematics device, a menu of a first telematics service to a k-th telematics service, to thereby allow the specific user to use the telematics service.

16 Claims, 9 Drawing Sheets

11 — HACC_GEN3_EV
```
{
 "com": "hacc",
 "gen": 3,
 "fuel": "ev",
 "RMT": {
  "SHOW_TSOC": true,
  "SCHEDULE": {
   "COUNT": 2,
   "SHARE_FATC": true,
   "OFF-PEAK": 1
  },
  "MVR": {
   "SHOW_ECO": true
  }
 }
}
```

12 — KCI_GEN2_PHEV
```
{
 "com": "kci",
 "gen": 2,
 "fuel": "phev",
 "RMT": {
  "SCHEDULE": {
   "COUNT": 2,
   "SHOW_FATC": false,
   "OFF-PEAK": 2
  },
  "MVR": {
   "SHOW_ECO": false
  }
 }
}
```

13 — HACC_GAS_LUXURY
```
{
 "com": "hacc",
 "gen": 0,
 "fuel": "gas",
 "RMT": {
  "RSHV": {
   "SHOW": true,
   "OPTION": {
    ...
   }
  },
  "MENU": {
   "HIDE_DEALER": true
  }
 }
}
```

FIG. 5

| TERMS | CATEGORIES | DESCRIPTION |
|---|---|---|
| FEATURE | N/A | KEY FACTOR TO DECIDE THE SCREEN RENDERING FOR EACH VEHICLE |
| TYPE | ICON | NEED TO CHANGE THE ICON IMAGE BASED ON THE FEATURE |
| | STRING | NEED TO CHANGE THE TEXT STRING BASED ON THE FEATURE |
| ATTRIBUTES | HIDE | NEED TO BE HIDDEN |
| | SHOW | NEED TO BE SHOWN |
| | CHANGE | EFFECTS ON OTHER SCREENS OR OPERATIONS OF CHANGING OF THIS ATTRIBUTE |
| | CONTROL | EFFECTS ON THE VEHICLE STATUS OR SERVER INTERACTION |

FIG. 6

| CATEGORY | | SERVICE FEATURE | CHANGE | DEPENDENCY |
|---|---|---|---|---|
| REMOTE SERVICE | ① | REMOTE ENGINE START | | EV ONLY |
| | ② | ENGINE START CANCEL | | EXCEPT EV |
| | ③ | LOCK | | COMMON |
| | ④ | UNLOCK | | COMMON |
| | ⑤ | HORN & LIGHT | | COMMON |
| | ⑥ | FLASH LIGHT | | COMMON |
| | ⑦ | CHARGE | | EXCEPT GAS |
| | ⑧ | SCHEDULE | | EXCEPT GAS |
| | ⑨ | TSOC | | GEN 3 & EV |
| | ⑩ | | CLIMATE SETTING | |

CATEGORY - REMOTE SERVICE / NORMAL

CATEGORY - REMOTE SERVICE / PHEV

CATEGORY - REMOTE SERVICE / EV

FIG. 7

| REMOTE SERVICE MAIN | DEFAULT REMOTE SERVICE |
|---|---|
| GEN TYPE DEPENDENCY | N/A |
| FUEL TYPE DEPENDENCY | GAS |
| COMPANY / MODEL DEPENDENCY | N/A |
| FEATURE DEPENDENCY | N/A |

| NO | FEATURE | TYPE | ATTRIBUTE |
|---|---|---|---|
| ① | START_ENGINE | ICON | HIDE/SHOW |
| | | | |
| | | | |
| | | | |

- ENGINE START
  ○ CHANGE THE ICON IMAGE BASED ON CURRENT ENGINE STATUS

[Screen showing: LOCK, UNLOCK, ENGINE START CANCEL, ENGINE START ①, HORN & LIGHTS, FLASH LIGHTS]

METHOD FOR PROVIDING ENHANCED TELEMATICS SERVICE AND TELEMATICS SERVER USING THE SAME

FIELD OF THE DISCLOSURE

The present disclosure relates to a method for providing a telematics service based on a vehicle model; and more particularly, to the method for dynamically constructing a telematics app, and a telematics server using the same.

BACKGROUND OF THE DISCLOSURE

In general, a term "telematics" is a compound derived from telecommunication and informatics. Drivers may remotely diagnose their vehicles through a wireless network and use a variety of information including traffic, living, and emergency rescue information. They may make calls, or send and receive emails by voice, and also download audiobooks.

In addition, a variety of telematics services are available depending on types of services including news subscription, stock investment, e-commerce, financial transactions, hotel reservations, facsimile transmission and reception, video games, car accident and theft reports, etc.

At earlier stages, such telematics services were provided based on call centers, but they have emerged as mobile app-based telematics services according to increase of mobile device users.

Meanwhile, in a conventional telematics service, a telematics app is installed on a telematics device, and a telematics service is used with the installed telematics app by a user.

In particular, the telematics service of vehicles provides a variety of functions according to a model of the vehicles and service characteristics, as compared with a mobile or web service having various functions in a specific service provided by a vehicle manufacturer, and a telematics service provider should configure different languages, services, and UIs for each localized function in order to provide the telematics service globally, rather than in specific countries.

For example, vehicle types, such as an electric car, a hybrid car, or a gas car, are different, and if the telematics services with different brand names, although with a same vehicle manufacturer, are provided, a basic standard of a screen displayed through the telematics app is the same, but their look and feel, image themes, and the types of services supported by each function may be different.

Therefore, the telematics service provider has to develop multiple telematics apps according to service areas and vehicle models.

In addition, when a specific function is added to or deleted from the telematics service, the telematics service provider must perform a software update of each of the multiple telematics apps to add or delete the specific function, and in order to distribute each updated telematics app, the distribution has to be authorized by an app-store provider, thus there is a problem that it takes a lot of time to update the telematics app when adding or deleting specific functions.

In addition, there is a possibility of coding errors due to frequent conditional branching in a process of developing the telematics app which are difficult to identify, and there is a disadvantage in that user convenience is reduced because frequent updates must be performed in order to perform maintenance against bugs occurring during use after distributing the telematics app.

SUMMARY OF THE DISCLOSURE

It is an object of the present disclosure to solve all the aforementioned problems.

It is another object of the present disclosure to provide a telematics service while maintaining a native app according to service areas or vehicle models.

It is still another object of the present disclosure to provide the telematics service without updating a telematics app even when a specific function is added to or deleted from the telematics service.

It is still yet another object of the present disclosure to easily maintain and support the telematics app for the telematics service.

It is still yet another object of the present disclosure to improve user convenience by minimizing updates of the telematics app with a function which has a high possibility of being frequently changed and added.

It is still yet another object of the present disclosure to allow changing and adding the function of the telematics app for the telematics service in real-time without the updates.

In accordance with one aspect of the present disclosure, there is provided a method for providing a telematics service based on a vehicle model, including steps of: (a) acquiring, by a telematics server when a log-in request including information on a specific user and information on a specific vehicle is acquired from a telematics application installed on a specific telematics device for using a telematics service, specific specification information on the specific vehicle, registered as corresponding to the information on the specific user and the information on the specific vehicle; (b-i) acquiring, by the telematics server, a specific configuration, in which a first telematics service item to a k-th telematics service item per telematics service category corresponding to the specific specification information of the specific vehicle are set, among a first configuration to an n-th configuration in which serviceable telematics service items are set for each telematics service category as corresponding to each piece of hierarchy information on specifications of multiple vehicles; (b-ii) transmitting, by the telematics server, the specific configuration to the specific telematics device; and (b-iii) displaying, by the specific telematics device in response to receiving the specific configuration, on a user interface of the telematics application on the specific telematics device, a menu of a first telematics service to a k-th telematics service respectively corresponding to the first telematics service item to the k-th telematics service item per the telematics service category, to thereby allow the specific user to use the telematics service based on the specific vehicle by using the specific telematics device.

As one example, at the step of (b), the telematics server (i) transmits the specific configuration to the specific telematics device, to thereby allow the telematics app on the specific telematics device to (i-1) retrieve a 1-st service feature to a k-th service feature, corresponding to the 1-st telematics service item to the k-th telematics service item per the telematics service category, from a service feature database, which stores each of service features corresponding to each and every one of serviceable telematics services per the telematics service category, in the specific telematics device, by referring to the specific configuration and (i-2) render and display the 1-st service feature to the k-th service feature per the telematics service category, and (ii) allows the specific user to use the telematics service based on the specific vehicle by using the specific telematics device.

As one example, the telematics server allows the telematics device to set a 1-st service feature location to a k-th service feature location for each of the 1-st service feature to the k-th service feature, by referring to the 1-st service feature to the k-th service feature, and renders the 1-st service feature to the k-th service feature as respectively corresponding to the 1-st service feature location to the k-th service feature location.

As one example, each of the service features corresponds to type information on a displayed configuration of said each of the service features and attribute information on said each of the service features.

As one example, the specific configuration includes confirmation information on serviceability toward the specific vehicle, for each of the 1-st telematics service item to the k-th telematics service item per the telematics service category.

As one example, the specific configuration is categorized into (i) the 1-st telematics service item to the k-th telematics service item corresponding to a specific service category, and (ii) each of actions or values corresponding to each of the 1-st telematics service item to the k-th telematics service item.

As one example, at the step of (b), the telematics server sets as common a 1-st common telematics service item to a j-th common telematics service item which are applicable to every vehicle per the telematics service category without regard to a specification of the specific vehicle, and instructs the telematics app on the specific telematics device to (i) retrieve (i-1) a 1-st common service feature to a j-th common service feature corresponding to a 1-st common telematics service item to a j-th common telematics service item per the telematics service category, and (i-2) a 1-st service feature to a k-th service feature corresponding to the 1-st telematics service item to the k-th telematics service item per the telematics service category from a service feature database, which stores each of service features corresponding to each and every one of serviceable telematics services per the telematics service category, in the specific telematics device by referring to the specific configuration, and (ii) render and display the 1-st common service feature to the j-th common service feature and the 1-st service feature to the k-th service feature per the telematics service category.

As one example, the telematics server allows the telematics device to (i) determine a 1-st common service feature location to a j-th common service feature location and a 1-st service feature location to a k-th service feature location for each of the 1-st common service feature to the j-th common service feature and the 1-st service feature to the k-th service feature, by referring to the 1-st common service feature to the j-th common service feature and the 1-st service feature to the k-th service feature, and (ii) renders the 1-st common service feature to the j-th common service feature and the 1-st service feature to the k-th service feature as respectively corresponding to the 1-st common service feature location to the j-th common service feature location and the 1-st service feature location to the k-th service feature location.

In accordance with another aspect of the present disclosure, there is provided a system including: a telematics server for providing a telematics service based on a vehicle model, including: at least one memory that stores instructions; and at least one processor configured to execute the instructions to perform processes of: (I) when a log-in request including information on a specific user and information on a specific vehicle is acquired from a telematics application installed on a specific telematics device for using a telematics service, acquiring specific specification information on the specific vehicle, registered as corresponding to the information on the specific user and the information on the specific vehicle; and (II) (i) acquiring a specific configuration, in which a first telematics service item to a k-th telematics service item per telematics service category corresponding to the specific specification information of the specific vehicle are set, among a first configuration to an n-th configuration in which serviceable telematics service items are set for each telematics service category as corresponding to each piece of hierarchy information on specifications of multiple vehicles, (ii) transmitting the specific configuration to the specific telematics device, to thereby allow the telematics app on the specific telematics device, in response to the specific configuration, to display a menu of a first telematics service to a k-th telematics service respectively corresponding to the first telematics service item to the k-th telematics service item per the telematics service category and (iii) allowing the specific user to use the telematics service based on the specific vehicle by using the specific telematics device; and the specific telematics device, including: at least one memory that stores a telematics application that when executed by the specific telematics device causes the specific telematics device to perform at least a process of displaying the menu of the first telematics service to the k-th telematics service respectively corresponding to the first telematics service item to the k-th telematics service item per the telematics service category in response to receiving the specific configuration from the telematics server.

As one example, at the process of (II), the processor (i) transmits the specific configuration to the specific telematics device, to thereby allow the telematics app on the specific telematics device to (i-1) retrieve a 1-st service feature to a k-th service feature, corresponding to the 1-st telematics service item to the k-th telematics service item per the telematics service category, from a service feature database, which stores each of service features corresponding to each and every one of serviceable telematics services per the telematics service category, in the specific telematics device, by referring to the specific configuration and (i-2) render and display the 1-st service feature to the k-th service feature per the telematics service category, and (ii) allows the specific user to use the telematics service based on the specific vehicle by using the specific telematics device.

As one example, the processor allows the telematics device to set a 1-st service feature location to a k-th service feature location for each of the 1-st service feature to the k-th service feature, by referring to the 1-st service feature to the k-th service feature, and renders the 1-st service feature to the k-th service feature as respectively corresponding to the 1-st service feature location to the k-th service feature location.

As one example, each of the service features corresponds to type information on a displayed configuration of said each of the service features and attribute information on said each of the service features.

As one example, the specific configuration includes confirmation information on serviceability toward the specific vehicle, for each of the 1-st telematics service item to the k-th telematics service item per the telematics service category.

As one example, the specific configuration is categorized into (i) the 1-st telematics service item to the k-th telematics service item corresponding to a specific service category, and (ii) each of actions or values corresponding to each of the 1-st telematics service item to the k-th telematics service item.

As one example, at the process of (II), the processor sets as common a 1-st common telematics service item to a j-th common telematics service item which are applicable to every vehicle per the telematics service category without regard to a specification of the specific vehicle, and instructs the telematics app on the specific telematics device to (i) retrieve (i-1) a 1-st common service feature to a j-th common service feature corresponding to a 1-st common telematics service item to a j-th common telematics service item per the telematics service category, and (i-2) a 1-st service feature to a k-th service feature corresponding to the 1-st telematics service item to the k-th telematics service item per the telematics service category from a service feature database, which stores each of service features corresponding to each and every one of serviceable telematics services per the telematics service category, in the specific telematics device by referring to the specific configuration, and (ii) render and display the 1-st common service feature to the j-th common service feature and the 1-st service feature to the k-th service feature per the telematics service category.

As one example, the processor allows the telematics device to (i) determine a 1-st common service feature location to a j-th common service feature location and a 1-st service feature location to a k-th service feature location for each of the 1-st common service feature to the j-th common service feature and the 1-st service feature to the k-th service feature, by referring to the 1-st common service feature to the j-th common service feature and the 1-st service feature to the k-th service feature, and (ii) renders the 1-st common service feature to the j-th common service feature and the 1-st service feature to the k-th service feature as respectively corresponding to the 1-st common service feature location to the j-th common service feature location and the 1-st service feature location to the k-th service feature location.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

To allow those skilled in the art to carry out the present disclosure easily, the example embodiments of the present disclosure will be explained by referring to attached diagrams in detail as shown below.

Figure 1:
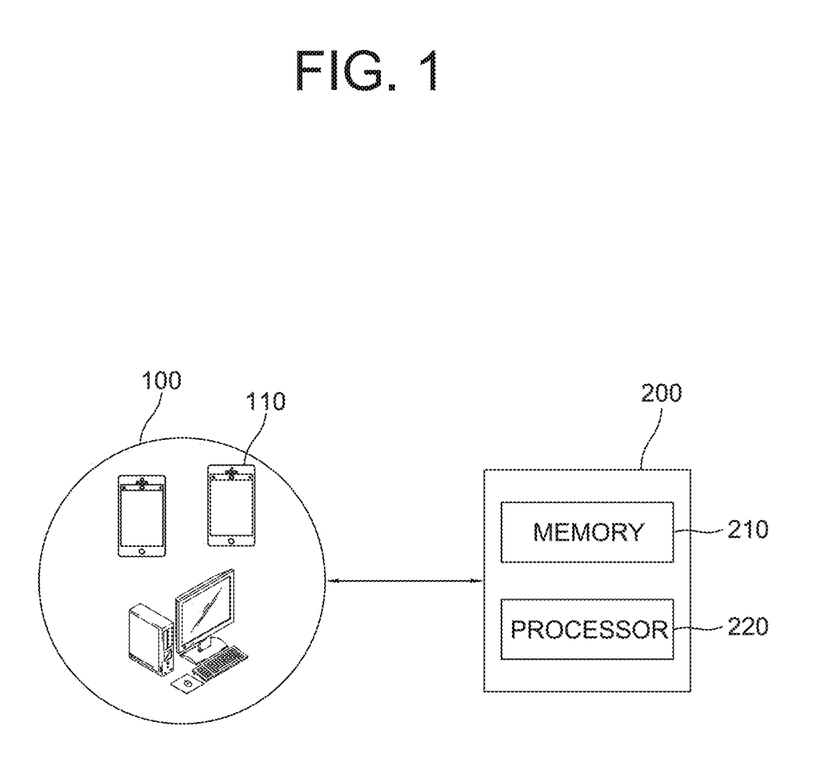
FIG. 1 is a drawing schematically illustrating a system providing a telematics service based on a vehicle model in accordance with one example embodiment of the present disclosure.

FIG. 1 is a drawing schematically illustrating a system providing a telematics service based on a vehicle model in accordance with one example embodiment of the present disclosure, and the system may include telematics devices 100 and a telematics server 200.

First, each of the telematics devices 100, where a telematics app for the telematics service is installed, may display a result of the telematics service in response to each user's choice. The telematics devices 100 may re-configure resources according to the configuration resulting from serviceable telematics service items dynamically constructed according to a specification of a vehicle, to thereby display the serviceable telematics service items for the user.

Herein, the telematics device 100 may include a lap-top PC, a tablet, a PDA, a smart phone, a mobile terminal device, etc., but the scope of the present disclosure is not limited thereto, and may include any computing devices capable of displaying, for the user, information received via communication with other devices and transmitting a data signal corresponding to an input signal of the user to other devices.

And, the telematics device 100 may include a memory where the telematics app is stored, a processor for performing processes of providing the telematics service to the user according to the telematics app stored in the memory, and a database where resources for providing the telematics service are stored.

Next, the telematics server 200 may provide the telematics service based on the vehicle model, and may include a memory 210 for storing instructions for providing the telematics service based on the vehicle model, and a processor 220 for performing processes for providing the telematics service based on the vehicle model, corresponding to the instructions in the memory 210.

Herein, if a log-in request including information on a specific user and information on a specific vehicle is acquired from the telematics app installed on a specific telematics device 110, the telematics server 200 may acquire specific specification information on the specific vehicle, registered as corresponding to the information on the specific user and the information on the specific vehicle and then may perform or support another device to perform processes of (i) acquiring a specific configuration, in which a 1-st telematics service item to a k-th telematics service item per telematics service category corresponding to the specific specification information of the specific vehicle are set, among a 1-st configuration to an n-th configuration in which serviceable telematics service items are set for each telematics service category as corresponding to each piece of hierarchy information on specifications of multiple vehicles, (ii) transmitting the specific configuration to the specific telematics device 110, to thereby allow the telematics app on the specific telematics device 110, in response to the specific configuration, to display a menu of a 1-st telematics service to a k-th telematics service respectively corresponding to the 1-st telematics service item to the k-th telematics service item per the telematics service category and (iii) allowing the specific user to use the telematics service based on the specific vehicle by using the specific telematics device 110. Meanwhile, FIG. 1 shows the single telematics server 200 for convenience of explanation, however, the telematics server 200 may be configured as multiple servers for providing the telematics service based on the vehicle model.

Specifically, the telematics server 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include operating system (OS) and software configuration of applications that achieve specific purposes.

A method configured as such for providing the telematics service based on the vehicle model, by using the system for providing the telematics service based on the vehicle model, in accordance with one example of the present disclosure is described by referring to FIGS. 2 to 9.

To be provided with the telematics service of the specific vehicle, on condition that the telematics service app on the specific telematics device 110 is running by the specific user, the specific user may select a log-in menu, to thereby transmit the log-in request to the telematics server 200. Meanwhile, the log-in menu is selected by the specific user, however, as another example, the specific user may execute the telematics service app on the specific telematics device 110, to thereby allow the telematics service app to transmit the log-in request to the telematics server 200.

Herein, the log-in request may include the information on the specific user and the information on the specific vehicle. And, the information on the specific user may include area information on the specific user and personal information on the specific user, but the scope of the present disclosure is not limited thereto, and may include any information related to the specific user. And, the information on the specific vehicle may include a plate number of the specific vehicle and a vehicle identification number (VIN) of the specific vehicle, etc., but the scope of the present disclosure is not limited thereto, and may include any information capable of identifying the specific vehicle.

Then, the telematics server 200 may acquire the specific specification information on the registered specific vehicle by referring to the information on the specific user and the information on the specific vehicle included in the log-in request acquired from the specific telematics device 110.

Herein, the specific specification information on the specific vehicle may include a service region, a vendor, a model type, a generation type, an engine type, a transmission type, and a seat type, but the scope of the present disclosure is not limited thereto, and may include the any specification information capable of categorizing the vehicles.

And, the service region may mean regions of the telematics app providing the telematics service, such as North America, Canada, etc., the vendor may mean vehicle manufacturers, such as Ford North America, Ford Mexico, Hyundai North America, Kia North America, etc., the model type may mean classes of the vehicle, such as premium, general, etc., the generation type may mean a generation of the telematics service, the engine type may mean types of vehicle engines, such as gas, hybrid (PHEV), EV, hydrogen, etc., the transmission type may mean types of a transmission such as automatic transmission, manual transmission, etc., and the seat type may mean types of seats according to its functions such as heating and venting. But the scope of the present disclosure is not limited thereto, and the specific specification information on the specific vehicle may include any information capable of hierarchical categorization of the vehicles according to the specification information on the vehicles.

Thereafter, the telematics server 200 may acquire the specific configuration, in which a 1-st telematics service item to a k-th telematics service item per telematics service category corresponding to the specific specification information of the specific vehicle are set, among a 1-st configuration to an n-th configuration in which serviceable telematics service items are set for each telematics service category as corresponding to each piece of hierarchy information on specifications of multiple vehicles. Herein, n and k may be constants. And, k may be different for each telematics service category.

Figure 2:
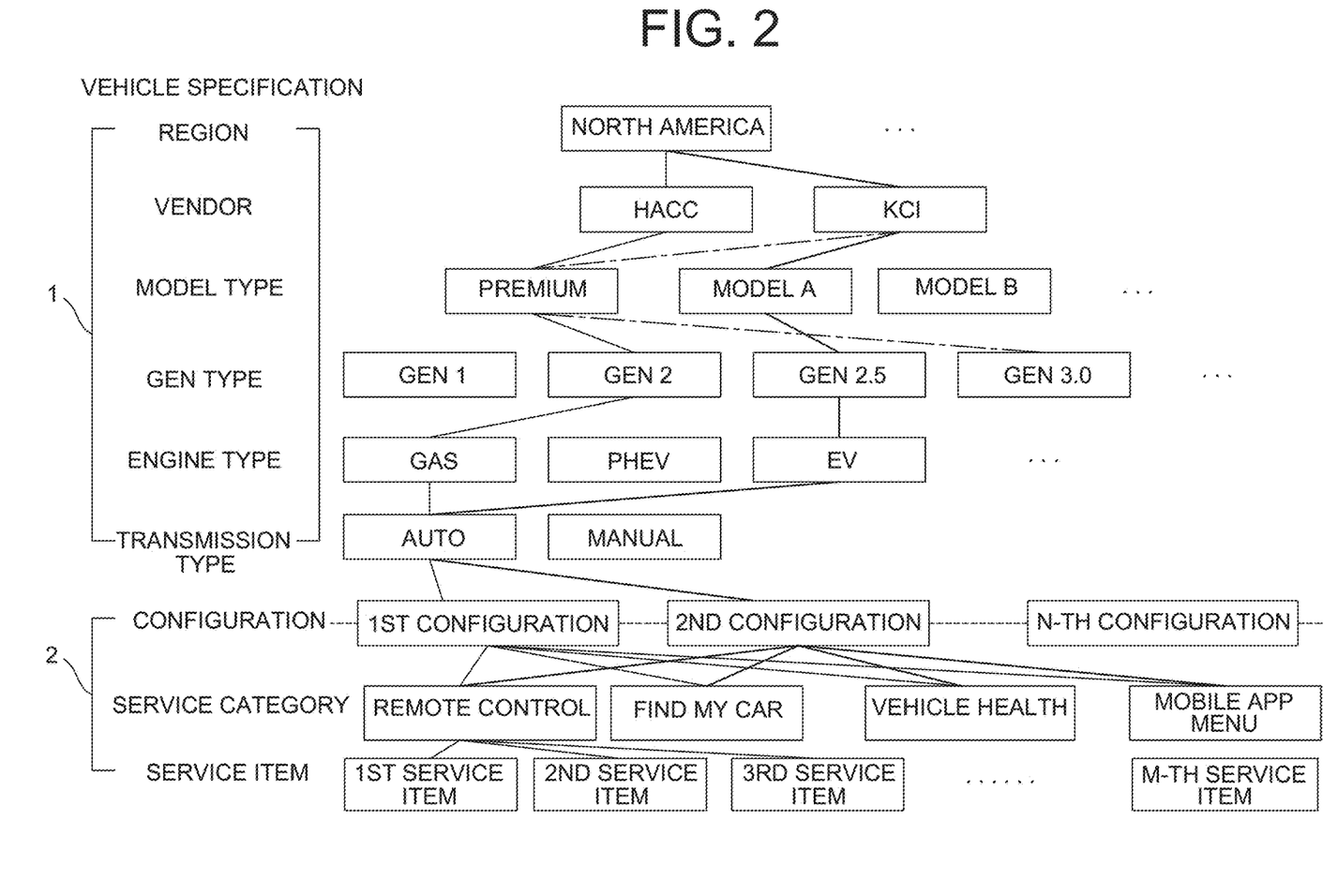
FIG. 2 is a drawing schematically illustrating a process of setting a configuration corresponding to hierarchy information on a specification of a vehicle in accordance with one example embodiment of the present disclosure.

Herein, by referring to FIG. 2, the 1-st configuration to the n-th configuration may be set, as corresponding to the hierarchy information of individual specifications of the vehicles matching categorical classification 1 of the specifications of the vehicles, such as the region, the vendor, the model type, the generation type, the engine type, and the transmission type. As one example, a vehicle with its region as North America, its vendor as HACC, its model type as premium, its generation type as generation 2, its engine type as gas, its transmission type as automatic transmission may be matched with the 1-st configuration, and a vehicle with its region as North America, its vendor as KCI, its model type as model A, its generation type as generation 2.5, its engine type as EV, its transmission type as automatic transmission may be matched with the 2-nd configuration.

And, for each of the 1-st configuration to the n-th configuration, the telematics service items 2 serviceable for each telematics service category may be set, as corresponding to the specifications of the vehicles according to the hierarchy information. That is, among the 1-st telematics service item to the m-th telematics service item on every telematics service serviceable for each telematics service category, e.g., remote control, find my car, vehicle health, mobile app menu, etc., the telematics service items serviceable for each telematics service category may be set, as corresponding to the specifications of the vehicles according to the hierarchy information. Herein, m may be a constant, or may be constants different for each telematics service category. That is, the number of the serviceable telematics services for each telematics service category may be different.

Figure 3:
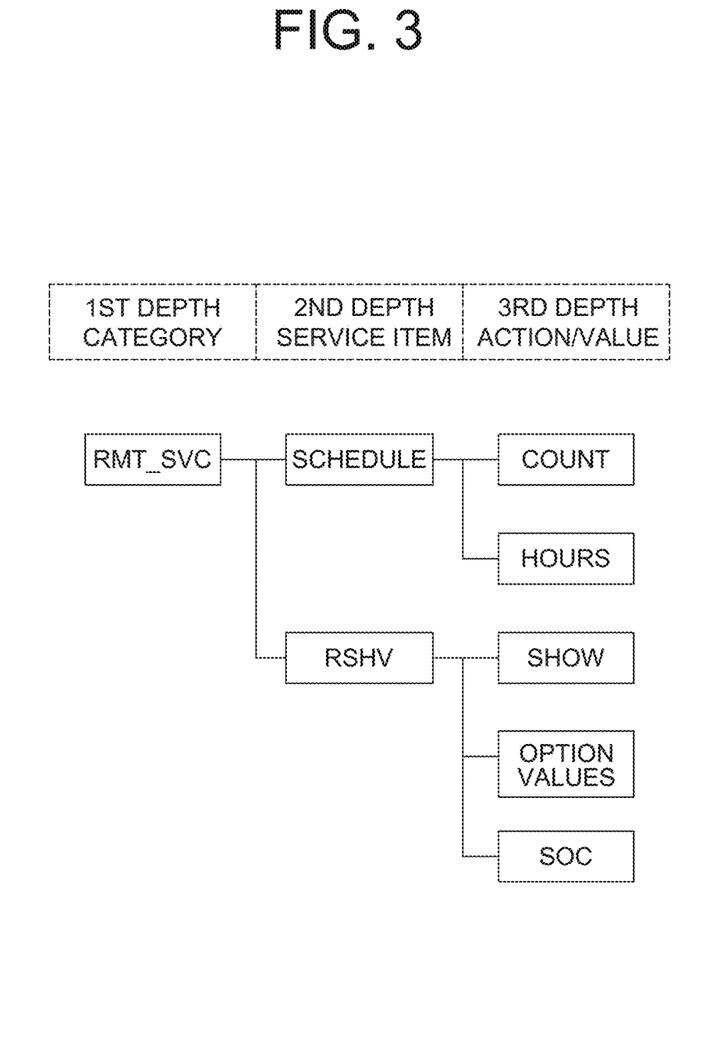
FIG. 3 is a drawing schematically illustrating the configuration in accordance with one example embodiment of the present disclosure.

Also, by referring to FIG. 3, the 1-st configuration to the n-th configuration may be respectively categorized into (i) service categories, (ii) the telematics service items corresponding to the service categories, and (ii) each of actions or values corresponding to each of the telematics service items.

Figure 4:
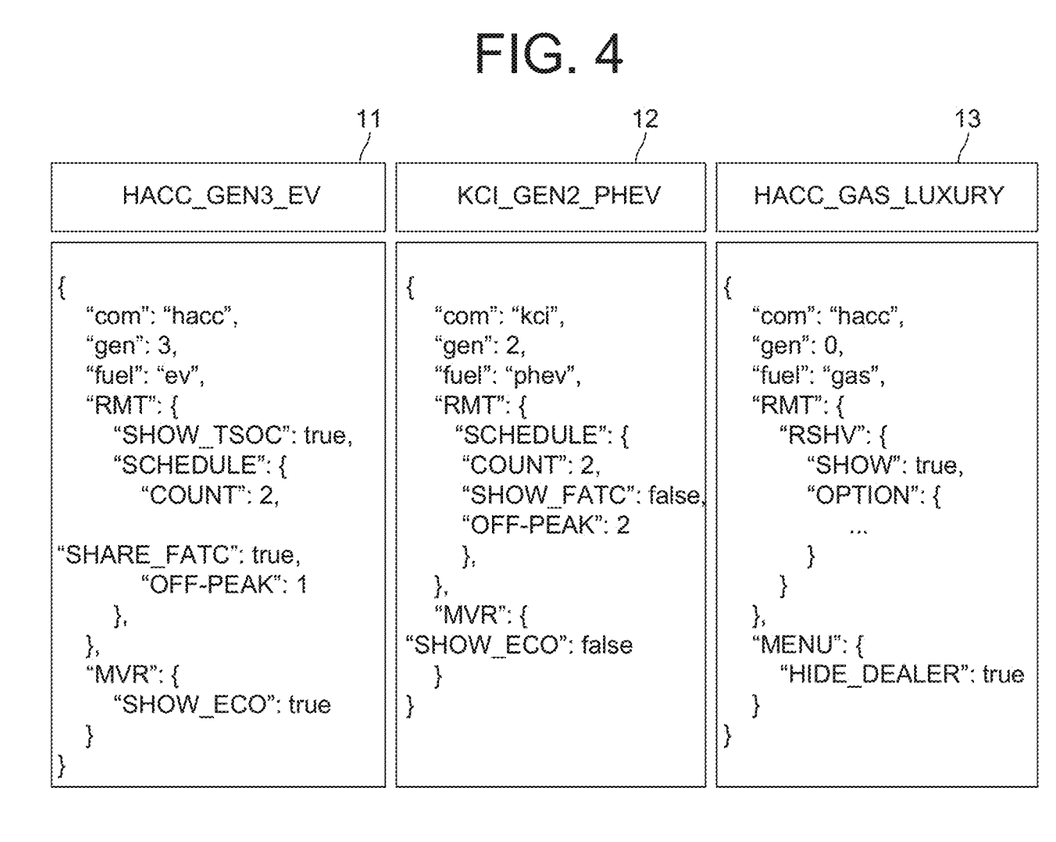
FIG. 4 is a drawing schematically illustrating examples of the configuration which are set in accordance with one example embodiment of the present disclosure.

As one example, by referring to FIG. 4, each configuration 11, 12, and 13 may be set for each of the vehicle models, e.g., HACC_GEN3_EV, KCI_GEN2_PHEV, and HACC_GAS_LUXURY.

As for the configuration 11 of the vehicle model HACC_GEN3_EV, its categories are set as "RMT" and "MVR", service items corresponding to the category "RMT" are set as "SHOW_TSOC" and "SCHEDULE", actions/values corresponding to the service item "SCHEDULE" are set as "COUNT", "SHARE_FATC" and "OFF_PEAK", and a service item corresponding to the category "MVR" is set as "SHOW_ECO". Herein, the service items checked as "true" may be displayed, and the service items checked as "false" may not be displayed.

As for the configuration 12 of the vehicle model KCI_GEN2_PHEV, its categories are set as "RMT" and "MVR", a service item corresponding to the category "RMT" is set as "SCHEDULE", actions/values corresponding to the service item "SCHEDULE" are set as "COUNT", "SHARE_FATC" and "OFF_PEAK", and a service item corresponding to the category "MVR" is set as "SHOW_ECO".

Also, as for the configuration 13 of the vehicle model HACC_GAS_LUXURY, its categories are set as "RMT" and "MENU", a service item corresponding to the category "RMT" is set as "RSHV", actions/values corresponding to the service item "RSHV" are set as "SHOW" and "OPTION", and a service item corresponding to the category "MENU" is set as "HIDE_DEALER".

As a result, the specific configuration, in which the 1-st telematics service item to the k-th telematics service item per the telematics service category corresponding to the specific specification information of the specific vehicle are set, may also have been categorized into (i) the 1-st telematics service item to the k-th telematics service item corresponding to a specific service category, and (ii) each of actions or values corresponding to each of the 1-st telematics service item to the k-th telematics service item.

Also, the specific configuration may include confirmation information on serviceability toward the specific vehicle, for each and every one of the serviceable telematics service items per the telematics service category.

Thereafter, the telematics server 200 may (i) transmit the specific configuration, in which the 1-st telematics service item to the k-th telematics service item per the telematics service category corresponding to the specific specification information of the specific vehicle are set, to the specific telematics device, to thereby allow the telematics app on the specific telematics device 110, in response to the specific configuration, to display a menu of a 1-st telematics service to a k-th telematics service respectively corresponding to the 1-st telematics service item to the k-th telematics service item per the telematics service category and (ii) allow the specific user to use the telematics service based on the specific vehicle by using the specific telematics device 110.

Figure 5:
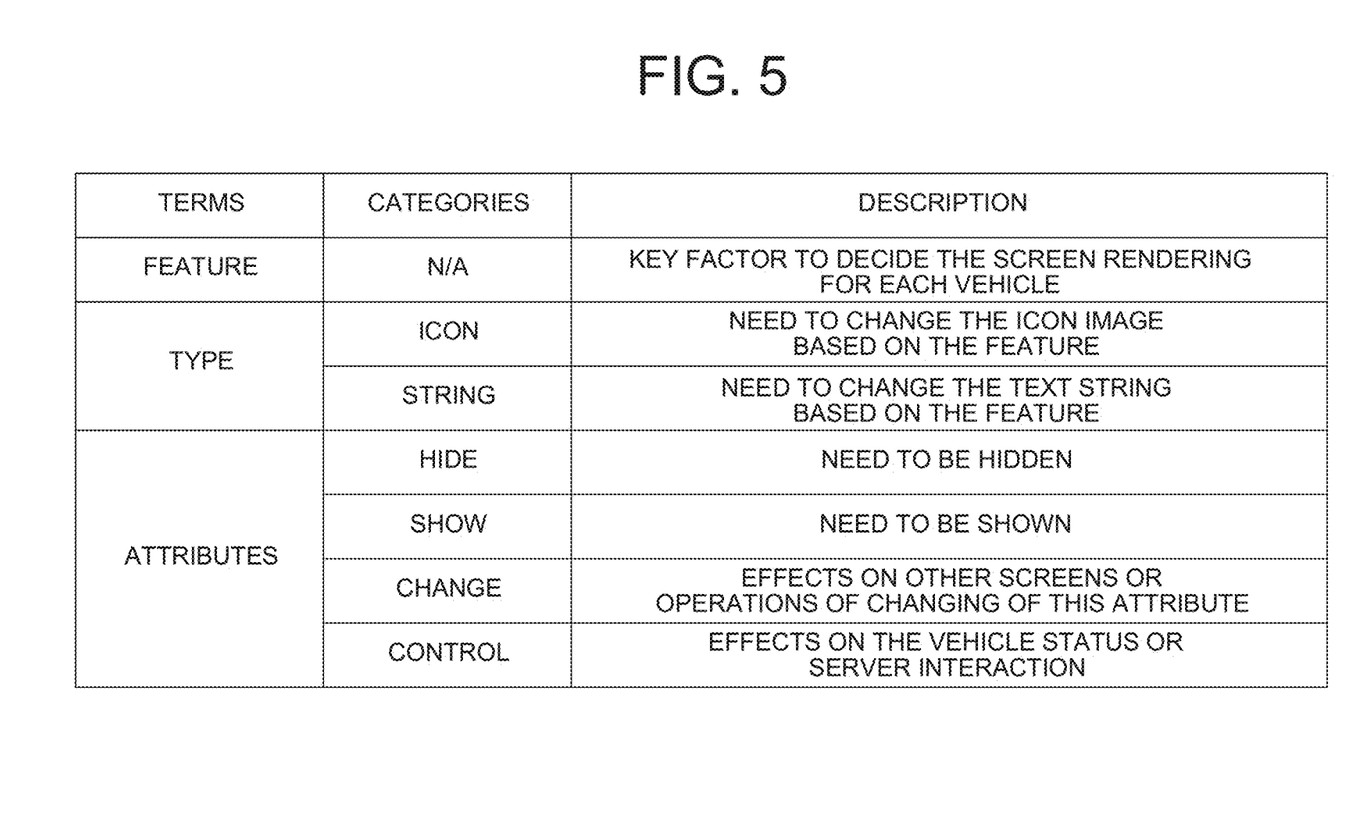
FIG. 5 is a drawing schematically illustrating a table of terms, categories, and their descriptions in accordance with one example embodiment of the present disclosure.

Herein, by referring to FIG. 5, each of the service features may correspond to type information on a displayed configuration of said each of the service features and attribute information on said each of the service features. As one example, the type information may include an icon image or a text string of the service features, and the attribute information may include Hide, Show, Change, Control, etc.

And, in response to the specific configuration, a process of displaying the menu of the 1-st telematics service to the k-th telematics service respectively corresponding to the 1-st telematics service item to the k-th telematics service item per the telematics service category through the specific telematics device 110 is described in detail as follows.

The telematics app of the specific telematics device 110 may retrieve a 1-st service feature to a k-th service feature corresponding to the 1-st telematics service item to the k-th telematics service item per the telematics service category from a service feature database, by referring to the specific configuration. Herein, the service feature database may store each of the service features corresponding to each and every one of the serviceable telematics services per the telematics service category, in the specific telematics device 110.

Thereafter, the telematics app on the specific telematics device 110 may render the 1-st service feature to the k-th service feature per the telematics service category, to thereby display them through the specific telematics device 110.

Herein, the telematics app on the specific telematics device 110 may set a 1-st service feature location to a k-th service feature location for each of the 1-st service feature to the k-th service feature, by referring to the 1-st service feature to the k-th service feature, and render the 1-st service feature to the k-th service feature as respectively corresponding to the 1-st service feature location to the k-th service feature location.

Figure 6:
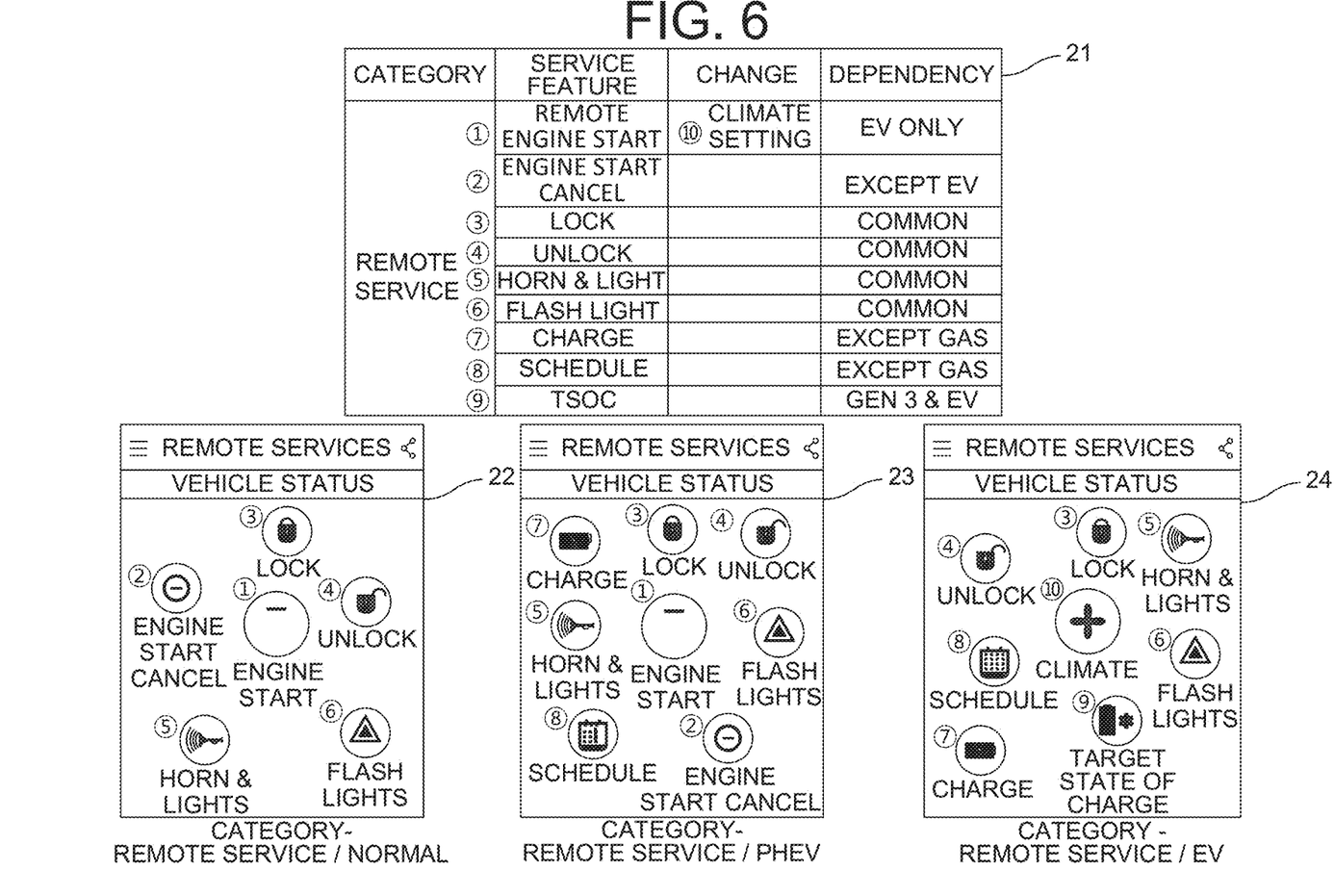
FIG. 6 is a drawing schematically illustrating implementations of the telematics service based on the vehicle model in accordance with one example embodiment of the present disclosure.

As one example, by referring to FIG. 6, the telematics service items of "remote engine start" ①, "engine start cancel" ②, "lock" ③, "unlock" ④, "horn & light" ⑤, "flash light" ⑥, "charge" ⑦, "schedule" ⑧, "target state of charge" ⑨, and "climate setting" ⑩ corresponding to the "remote service" category are displayed on the telematics devices 100 according to a table 21 listing serviceability, i.e., dependency, conforming to the configuration, and as for the vehicle 22 with categories remote service/normal according to its specification, the telematics service features corresponding to a basic telematics service, i.e., "remote engine start" ①, "engine start cancel" ②, "lock" ③, "unlock" ④, "horn & light" ⑤, and "flash light" ⑥, may be displayed, and as for the vehicle 23 with categories remote service/PHEV according to its specification, the telematics service features corresponding to "charge" ⑦ and "schedule" ⑧ in addition to the telematics service features corresponding to the basic telematics service, i.e., "remote engine start" ①, "engine start cancel" ②, "lock" ③, "unlock" ④, "horn & light" ⑤, and "flash light" ⑥, may be displayed. And, as for the vehicle 24 with categories remote service/EV according to its specification, "remote engine start" ① may be changed into "climate setting" ⑩, and "engine start cancel" ② may be deleted. As a result, for the vehicle 24, the telematics service features corresponding to "lock" ③, "unlock" ④, "horn & light" ⑤, "flash light" ⑥, "charge" ⑦, "schedule" ⑧, "target state of charge" ⑨, and "climate setting" ⑩ may be displayed.

Also, to allow display of the menu of the 1-st telematics service to the k-th telematics service respectively corresponding to the 1-st telematics service item to the k-th telematics service item per the telematics service category through the specific telematics device 110 in response to the specific configuration, telematics server 200 may set as common a 1-st common telematics service item to a j-th common telematics service item which are applicable to every vehicle per the telematics service category without regard to the specification of the specific vehicle, and may instruct the telematics app on the specific telematics device 110 to (i) retrieve (i-1) a 1-st common service feature to a j-th common service feature corresponding to a 1-st common telematics service item to a j-th common telematics service item per the telematics service category, and (i-2) the 1-st service feature to the k-th service feature corresponding to the 1-st telematics service item to the k-th telematics service item per the telematics service category from the service feature database, by referring to the specific configuration, and (ii) render and display the 1-st common service feature to the j-th common service feature and the 1-st service feature to the k-th service feature per the telematics service category.

Herein, the telematics server 200 may allow the telematics device 110 to (i) determine a 1-st common service feature location to a j-th common service feature location and a 1-st service feature location to a k-th service feature location for each of the 1-st common service feature to the j-th common service feature and the 1-st service feature to the k-th service feature, by referring to the 1-st common service feature to the j-th common service feature and the 1-st service feature to the k-th service feature, and (ii) renders the 1-st common service feature to the j-th common service feature and the 1-st service feature to the k-th service feature as respectively corresponding to the 1-st common service feature location to the j-th common service feature location and the 1-st service feature location to the k-th service feature location.

Figure 7:
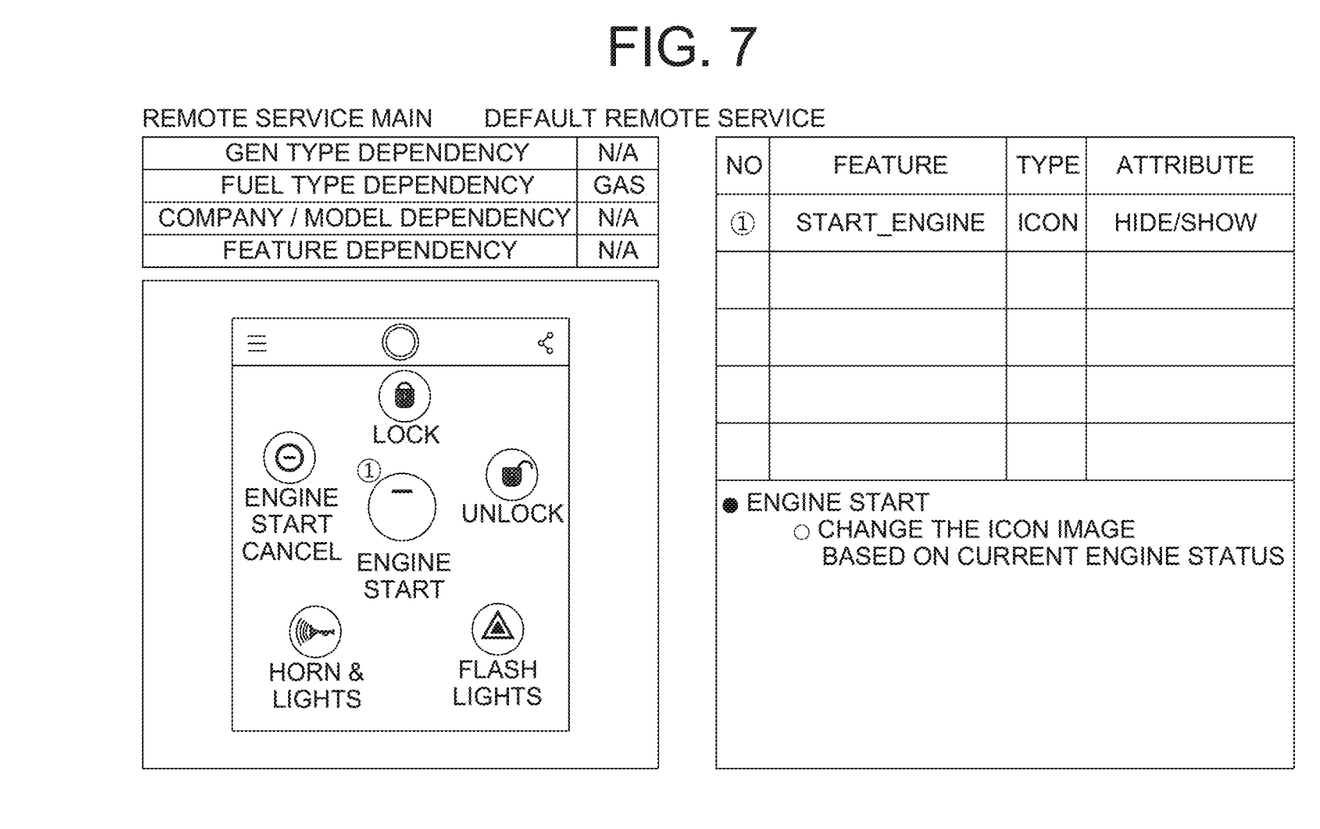
FIGS. 7 to 9 are drawings schematically illustrating other implementations of the telematics service based on the vehicle model in accordance with one example embodiment of the present disclosure.
Figure 8:
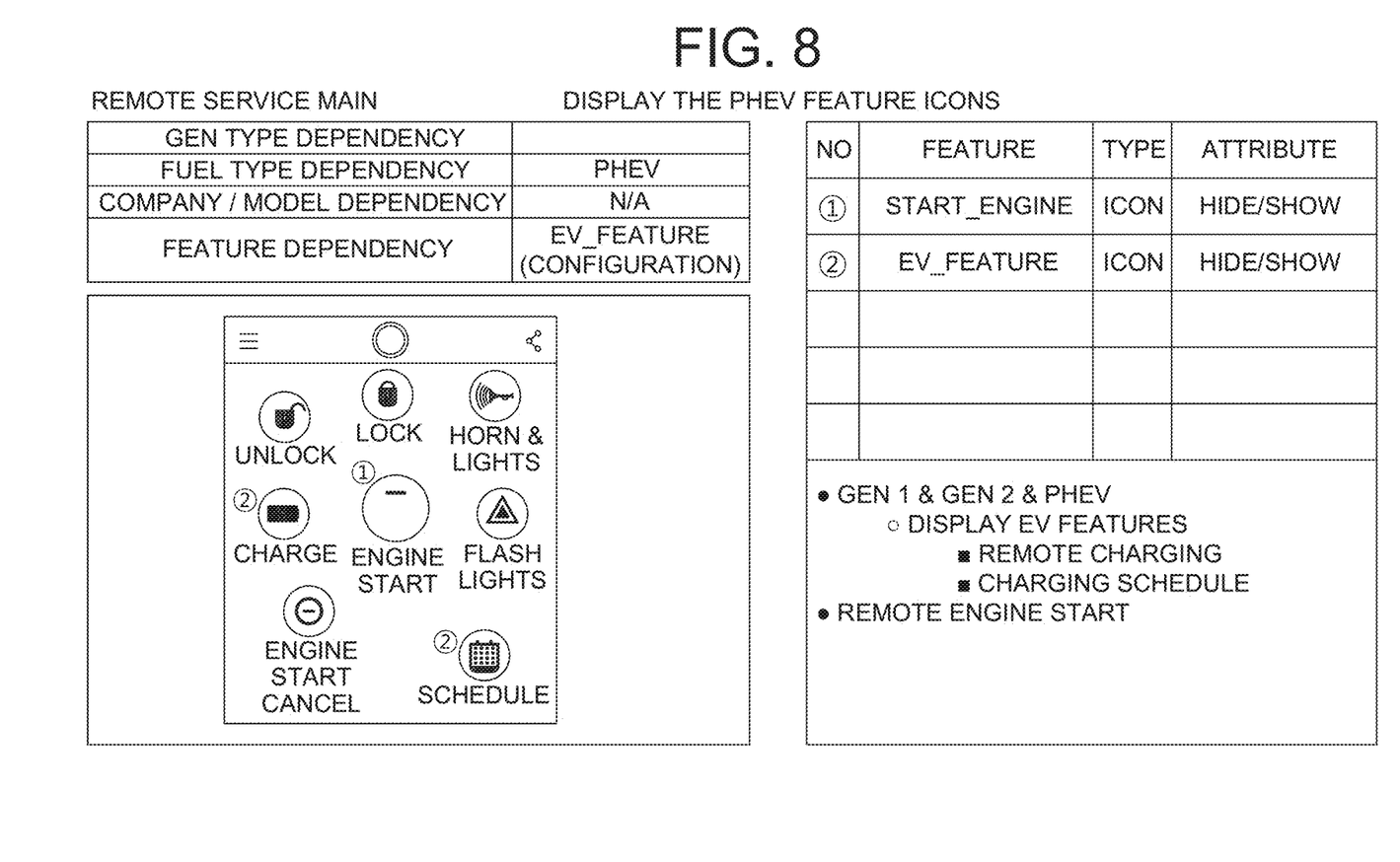
Figure 9:
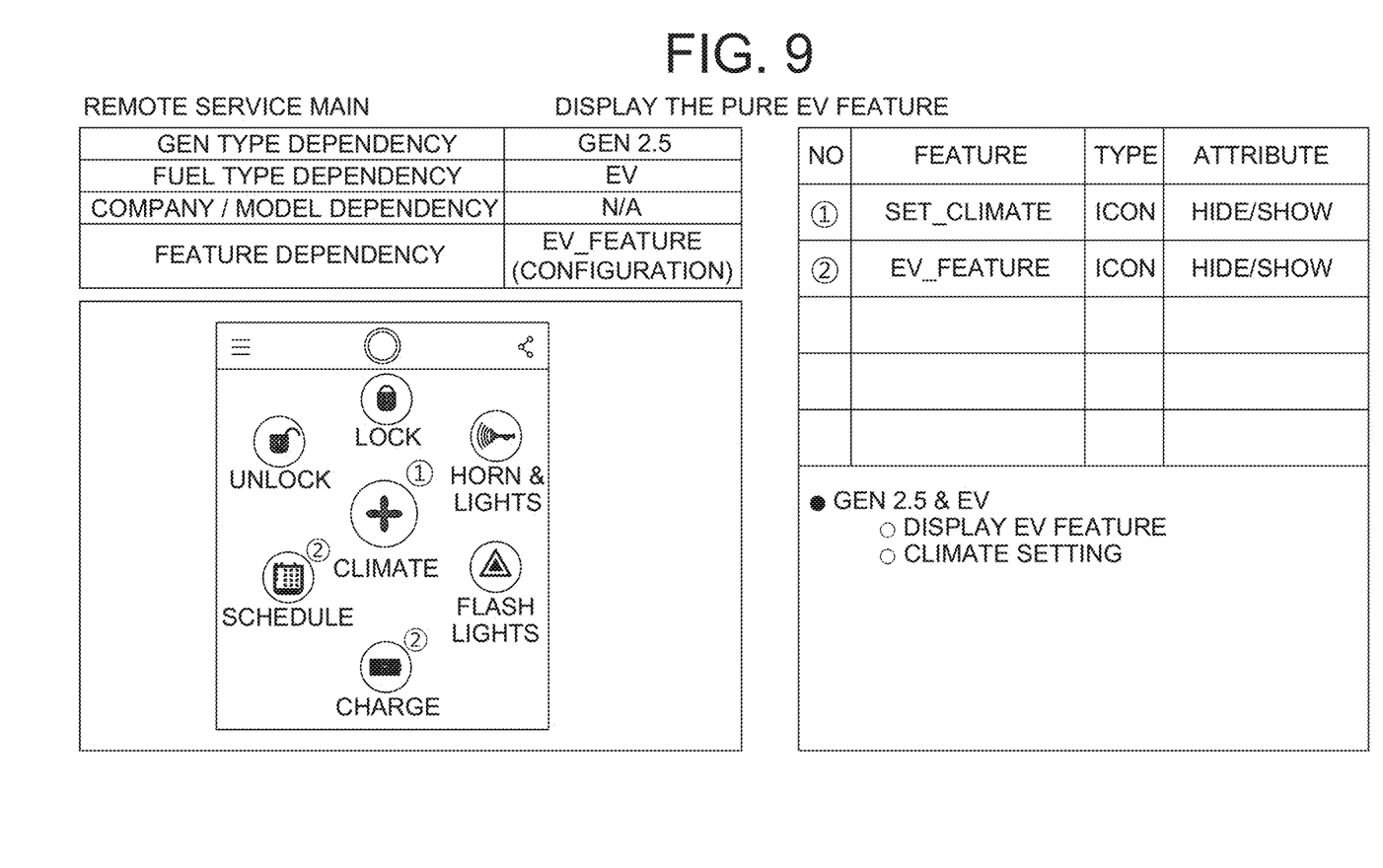

As one example, by referring to FIGS. 7 to 9, the telematics service items set as common without additional telematics service items according to the configuration are displayed in FIG. 7, additional telematics service items corresponding to "EV_FEATURE" according to the configuration of "EV_FEATURE" corresponding to the "PHEV" vehicle are displayed in FIG. 8, and additional telematics service items corresponding to "EV_FEATURE" according to the configuration of "EV_FEATURE" corresponding to the "EV" vehicle are displayed in FIG. 9.

In FIG. 7, on condition that "remote engine start", "engine start cancel", "lock", "unlock", "horn & light", and "flash light" are set as common corresponding to the "remote service" category, after change of an icon image of "remote engine start" to match the engine type of the vehicle corresponding to the configuration, icon images corresponding to "remote engine start", "engine start cancel", "lock", "unlock", "horn & light", and "flash light" are displayed on their corresponding locations.

And in FIG. 8, on condition that "remote engine start", "engine start cancel", "lock", "unlock", "horn & light", and "flash light" are set as common corresponding to the "remote service" category, after addition of "remote charge" and "charge schedule" corresponding to "EV_FEATURE" according to the configuration of "EV_FEATURE" corresponding to the "PHEV" vehicle, icon images corresponding to "remote engine start", "engine start cancel", "lock", "unlock", "horn & light", "flash light", "remote charge" and "charge schedule" are displayed on their corresponding locations.

And in FIG. 9, on condition that "remote engine start", "engine start cancel", "lock", "unlock", "horn & light", and "flash light" are set as common, after deletion of "engine start cancel", change of "remote engine start" into "climate setting" according to the configuration of "EV_FEATURE", and addition of "remote charge" and "charge schedule" corresponding to "EV_FEATURE" corresponding to the "PHEV" vehicle, icon images corresponding to "climate setting", "lock", "unlock", "horn & light", "flash light", "remote charge" and "charge schedule" are displayed on their corresponding locations.

The present disclosure has an effect of providing the telematics service while maintaining a native app according to service areas or vehicle models by dynamically constructing the serviceable telematics service items through the configuration according to the information on the user and the information on the vehicle and re-configuring resources on the telematics device according to the configuration.

The present disclosure has another effect of providing the telematics service without updating the telematics app even when a specific function is added to or deleted from the telematics service by dynamically constructing the serviceable telematics service items through the configuration according to the information on the user and the information on the vehicle and re-configuring the resources on the telematics device according to the configuration.

The present disclosure has still another effect of providing easy maintenance and support for the telematics app for the telematics service by dynamically constructing the serviceable telematics service items through the configuration according to the information on the user and the information on the vehicle and re-configuring the resources on the telematics device according to the configuration.

The present disclosure has still yet another effect of improving user convenience through minimizing updates of the telematics app with a function which has a high possibility of being frequently changed and added by dynamically constructing the serviceable telematics service items through the configuration according to the information on the user and the information on the vehicle and re-configuring the resources on the telematics device according to the configuration.

The present disclosure has still yet another effect of allowing changes and addition of the function of the telematics app in real-time without the updates by dynamically constructing the serviceable telematics service items through the configuration according to the information on the user and the information on the vehicle and re-configuring the resources on the telematics device according to the configuration.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a telematics service based on a vehicle model, comprising steps of:
   (a) acquiring, by a telematics server when a log-in request including information on a specific user and information on a specific vehicle is acquired from a telematics application installed on a specific telematics device for using a telematics service, specific specification information on the specific vehicle, registered as corresponding to the information on the specific user and the information on the specific vehicle;
   (b-i) acquiring, by the telematics server, a specific configuration, in which a first telematics service item to a k-th telematics service item per telematics service category corresponding to the specific specification information of the specific vehicle are set, among a first configuration to an n-th configuration in which serviceable telematics service items are set for each telematics service category as corresponding to each piece of hierarchy information on specifications of multiple vehicles;
   (b-ii) transmitting, by the telematics server, the specific configuration to the specific telematics device; and
   (b-iii) displaying, by the specific telematics device in response to receiving the specific configuration, on a user interface of the telematics application on the specific telematics device, a menu of a first telematics service to a k-th telematics service respectively corresponding to the first telematics service item to the k-th telematics service item per the telematics service category, to thereby allow the specific user to use the telematics service based on the specific vehicle by using the specific telematics device.

2. The method of claim 1, further comprising:
   (i-1) retrieving, by the telematics application on the specific telematics device, a first service feature to a k-th service feature, corresponding to the first telematics service item to the k-th telematics service item per the telematics service category, from a service feature database, which stores each of service features corresponding to each and every one of serviceable telematics services per the telematics service category, in the specific telematics device, by referring to the specific configuration; and
   (i-2) rendering and displaying, by the telematics application on the specific telematics device, the first service feature to the k-th service feature per the telematics service category, to thereby allow the specific user to use the telematics service based on the specific vehicle by using the specific telematics device.

3. The method of claim 2, further comprising:
   allowing, by the telematics server, the specific telematics device to set a first service feature location to a k-th service feature location for each of the first service feature to the k-th service feature, by referring to the first service feature to the k-th service feature, and rendering, by the telematics server, the first service feature to the k-th service feature as respectively corresponding to the first service feature location to the k-th service feature location.

4. The method of claim 2, wherein each of the service features corresponds to type information on a displayed configuration of said each of the service features and attribute information on said each of the service features.

5. The method of claim 1, wherein the specific configuration includes confirmation information on serviceability toward the specific vehicle, for each of the first telematics service item to the k-th telematics service item per the telematics service category.

6. The method of claim 1, wherein the specific configuration is categorized into (i) the first telematics service item to the k-th telematics service item corresponding to a specific service category, and (ii) each of actions or values corresponding to each of the first telematics service item to the k-th telematics service item.

7. The method of claim 1, further comprising:
   setting, by the telematics server, as common a first common telematics service item to a j-th common telematics service item which are applicable to every vehicle per the telematics service category without regard to a specification of the specific vehicle, and
   instructing, by the telematics server, the telematics application on the specific telematics device to (i) retrieve (i-1) a first common service feature to a j-th common service feature corresponding to a first common telematics service item to a j-th common telematics service item per the telematics service category, and (i-2) a first service feature to a k-th service feature corresponding to the first telematics service item to the k-th telematics service item per the telematics service category from a service feature database, which stores each of service features corresponding to each and every one of serviceable telematics services per the telematics service category, in the specific telematics device by referring to the specific configuration, and (ii) render and display the first common service feature to the j-th common service feature and the first service feature to the k-th service feature per the telematics service category.

8. The method of claim 7, further comprising allowing, by the telematics server, the specific telematics device to (i) determine a first common service feature location to a j-th common service feature location and a first service feature location to a k-th service feature location for each of the first common service feature to the j-th common service feature and the first service feature to the k-th service feature, by referring to the first common service feature to the j-th common service feature and the first service feature to the k-th service feature, and (ii) render the first common service feature to the j-th common service feature and the first service feature to the k-th service feature as respectively corresponding to the first common service feature location to the j-th common service feature location and the first service feature location to the k-th service feature location.

9. A system, comprising:
   a telematics server for providing a telematics service based on a vehicle model, comprising:
      at least one memory that stores instructions; and
      at least one processor configured to execute the instructions to perform processes of:
         (I) when a log-in request including information on a specific user and information on a specific vehicle is acquired from a telematics application installed on a specific telematics device for using a telematics service, acquiring specific specification information on the specific vehicle, registered as corresponding to the information on the specific user and the information on the specific vehicle; and (II) (i) acquiring a specific configuration, in which a first telematics service item to a k-th telematics service item per telematics service category corresponding to the specific specification information of the specific vehicle are set, among a first configuration to an n-th configuration in which serviceable telematics service items are set for each telematics service category as corresponding to each piece of hierarchy information on specifications of multiple vehicles, (ii) transmitting the specific configuration to the specific telematics device, to thereby allow the telematics application on the specific telematics device, in response to the specific configuration, to display a menu of a first telematics service to a k-th telematics service respectively corresponding to the first telematics service item to the k-th telematics service item per the telematics service category and (iii) allowing the specific user to use the telematics service based on the specific vehicle by using the specific telematics device; and the specific telematics device, comprising:
at least one memory that stores a telematics application that when executed by the specific telematics device causes the specific telematics device to perform at least a process of:
displaying the menu of the first telematics service to the k-th telematics service respectively corresponding to the first telematics service item to the k-th telematics service item per the telematics service category in response to receiving the specific configuration from the telematics server.

10. The system of claim 9,
wherein, at the process of (II), the processor of the telematics server is configured to execute the instructions to perform a process of (i) transmitting the specific configuration to the specific telematics device, and
wherein the telematics application when executed by the specific telematics device causes the specific telematics device to perform processes of
(i-1) retrieving a first service feature to a k-th service feature, corresponding to the first telematics service item to the k-th telematics service item per the telematics service category, from a service feature database, which stores each of service features corresponding to each and every one of serviceable telematics services per the telematics service category, in the specific telematics device, by referring to the specific configuration and
(i-2) rendering and displaying the first service feature to the k-th service feature per the telematics service category, to thereby allow the specific user to use the telematics service based on the specific vehicle by using the specific telematics device.

11. The system of claim 10, wherein the telematics application when executed by the specific telematics device causes the specific telematics device to perform processes of:
setting a first service feature location to a k-th service feature location for each of the first service feature to the k-th service feature, by referring to the first service feature to the k-th service feature, and
rendering the first service feature to the k-th service feature as respectively corresponding to the first service feature location to the k-th service feature location.

12. The system of claim 10, wherein each of the service features corresponds to type information on a displayed configuration of said each of the service features and attribute information on said each of the service features.

13. The system of claim 9, wherein the specific configuration includes confirmation information on serviceability toward the specific vehicle, for each of the first telematics service item to the k-th telematics service item per the telematics service category.

14. The system of claim 9, wherein the specific configuration is categorized into (i) the first telematics service item to the k-th telematics service item corresponding to a specific service category, and (ii) each of actions or values corresponding to each of the first telematics service item to the k-th telematics service item.

15. The system of claim 9,
wherein, at the process of (II), the processor of the telematics server is configured to execute the instructions to perform a process of setting as common a first common telematics service item to a j-th common telematics service item which are applicable to every vehicle per the telematics service category without regard to a specification of the specific vehicle, and
wherein the telematics application when executed by the specific telematics device causes the specific telematics device to perform processes of:
(i) retrieving:
(i-1) a first common service feature to a j-th common service feature corresponding to a first common telematics service item to a j-th common telematics service item per the telematics service category, and
(i-2) a first service feature to a k-th service feature corresponding to the first telematics service item to the k-th telematics service item per the telematics service category from a service feature database, which stores each of service features corresponding to each and every one of serviceable telematics services per the telematics service category, in the specific telematics device by referring to the specific configuration, and
(ii) rendering and displaying the first common service feature to the j-th common service feature and the first service feature to the k-th service feature per the telematics service category.

16. The system of claim 15, wherein the telematics application when executed by the specific telematics device causes the specific telematics device to perform processes of:
(i) determining a first common service feature location to a j-th common service feature location and a first service feature location to a k-th service feature location for each of the first common service feature to the j-th common service feature and the first service feature to the k-th service feature, by referring to the first common service feature to the j-th common service feature and the first service feature to the k-th service feature, and
(ii) rendering the first common service feature to the j-th common service feature and the first service feature to the k-th service feature as respectively corresponding to the first common service feature location to the j-th common service feature location and the first service feature location to the k-th service feature location.

* * * * *